(12) United States Patent
Ukrainetz et al.

(10) Patent No.: US 7,469,361 B2
(45) Date of Patent: Dec. 23, 2008

(54) MONITORING DETECTION AND REMOVAL OF MALFUNCTIONING DEVICES FROM AN ARBITRATED LOOP

(75) Inventors: Nathan H. W. Ukrainetz, Costa Mesa, CA (US); Martin Daniel Stainbrook, Costa Mesa, CA (US); Long Wei, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 747 days.

(21) Appl. No.: 11/029,736

(22) Filed: Jan. 4, 2005

(65) Prior Publication Data

US 2006/0146698 A1 Jul. 6, 2006

(51) Int. Cl.
*G06F 11/00* (2006.01)
(52) U.S. Cl. .............................. 714/43; 714/42; 370/221
(58) Field of Classification Search .................... 714/42, 714/43; 370/221
See application file for complete search history.

(56) References Cited

U.S. PATENT DOCUMENTS

| | | | | |
|---|---|---|---|---|
| 4,633,468 A | * | 12/1986 | Skatrud et al. ............... | 714/717 |
| 5,132,962 A | * | 7/1992 | Hobgood et al. ............. | 370/223 |
| 6,201,787 B1 | * | 3/2001 | Baldwin et al. .............. | 370/222 |
| 7,269,131 B2 | * | 9/2007 | Cashman et al. ............. | 370/217 |
| 7,317,719 B2 | * | 1/2008 | Porter ......................... | 370/360 |
| 2003/0005368 A1 | * | 1/2003 | Beer et al. .................... | 714/43 |
| 2006/0146698 A1 | * | 7/2006 | Ukrainetz et al. ............ | 370/221 |

* cited by examiner

*Primary Examiner*—Emerson C Puente
(74) *Attorney, Agent, or Firm*—Morrison & Foerster LLP

(57) ABSTRACT

The detection, removal and reinsertion of possibly malfunctioning devices from an arbitrated loop is disclosed. When a new device is first connected to a storage switch and a loop is formed and begins initialization, a LOOP_DOWN event is sent to a processor and a loop down timer is started for each port in the loop. If initialization is successful, a LOOP_UP event is sent to the processor and the loop down timer is reset for each port in the loop. However, if one of the loop down timers times out, a problem occurred during the initialization. The port associated with the timed out timer is bypassed so that the devices in the remainder of the loop can continue trying to complete the initialization. The processor initiates a PTBI event on the bypassed device. If the bypassed device is operating properly, it is re-inserted back into the loop.

21 Claims, 3 Drawing Sheets

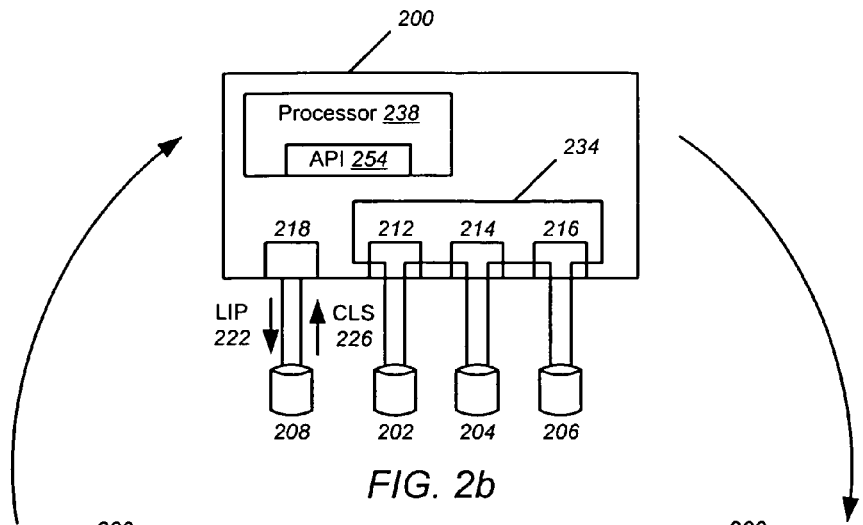
FIG. 2b
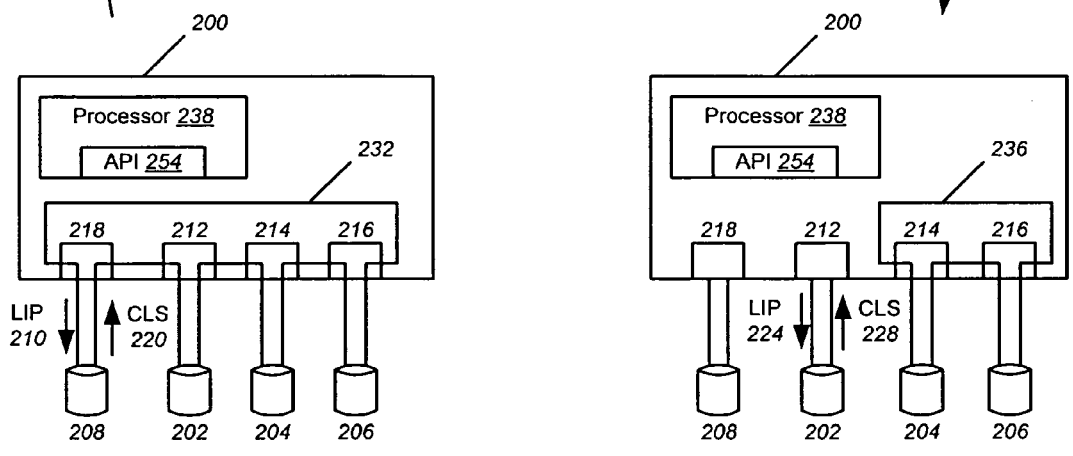
FIG. 2a
FIG. 2c
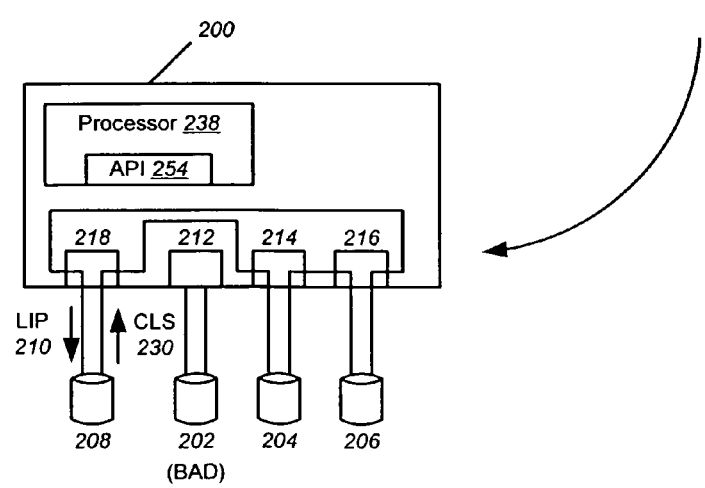
FIG. 2d

MONITORING DETECTION AND REMOVAL OF MALFUNCTIONING DEVICES FROM AN ARBITRATED LOOP

BACKGROUND OF THE INVENTION

1. Field of the Invention

The present invention relates, generally, to the initialization of devices in an arbitrated loop, and in particular embodiments, to the monitoring, detection, removal and recovery of malfunctioning devices from an arbitrated loop during initialization.

2. Description of Related Art

Non-blocking crossbar switches for storage systems (storage switches) are generally implemented in several configurations. In one configuration, the storage switch is connected within an enclosure to an arbitrated loop of drives referred to as Just a Bunch Of Disks (JBODs), and the enclosure is referred to as a Switched Bunch Of Disks (SBOD). In another configuration, the storage switch is contained in an enclosure referred to as a root switch, which connects externally to a number of JBODs. In yet another configuration, a root switch is connected to SBODs in a fully switched architecture.

In any of these configurations, when a device is first connected to a port on the storage switch, all of the devices previously connected to that storage switch must be initialized. Note that a device, as referred to herein, includes, but is not limited to, disk drives, host bus adapters (HBAs) and other Fibre Channel (FC) devices. For example, FIG. 1a illustrates an exemplary storage switch 100 including ports 118, 112, 114 and 116, and a processor 138. It should be understood that a four-port storage switch 100 is illustrated herein for purposes of explanation only, but that other commercially available storage switches may have a different number of ports. In the example of FIG. 1, the storage switch 100 is initially connected to devices 102, 104 and 106 via the ports. When a new device 108 is first connected to the storage switch 100 at port 118, its operation may be verified before it is inserted into the loop using a well-known procedure referred to as Port Test Before Insert (PTBI). If PTBI is enabled in the firmware being executed by the processor 138, the processor 138 performs a PTBI event upon the connection of the new device 108 into the storage switch 100.

The PTBI event first instructs the storage switch 100 to configure port 118 in a loop back mode, so that new device 108 is essentially configured in an individual loop, isolated from all other devices connected to the storage switch 100. Processor 138 then sends a number of Loop Initialization Primitive (LIP) ordered sets 122 (a four-byte sequence) to new device 108 to start an individual LIP cycle. This individual LIP cycle also results in the starting of a device monitor timer in processor 138. After the device monitor timer times out, processor 138 evaluates new device 108 to determine if it is behaving properly or malfunctioning. At the physical layer, new device 108 can be identified as malfunctioning if cyclic redundancy check (CRC) errors were generated, if there were ordered set (OS) errors, or if there were bad transmission words. At the FC protocol level, new device 108 can be identified as malfunctioning if the new device 108 does not return a start of frame (SOF), IDLE, arbitrate (ARB) or end of frame (EOF) ordered set, or if the new device 108 does not return a close (CLS) ordered set 126 (which signifies the end of the individual LIP cycle). As long as new device 108 is found to be malfunctioning, PTBI events are repeatedly performed.

As illustrated in FIG. 1b, if the PTBI event indicates that new device 108 is operating properly, processor 138 initiates another LIP cycle by sending out additional LIP ordered sets 110 to new device 108. The purpose of this LIP cycle is to initialize both ends of the communication link by identifying all devices connected to the storage switch 100 with a unique address, and establish a common format for communications.

When the LIP cycle is started, the storage switch 100 sends a LOOP_DOWN event associated with port 118 to the processor 138, and configures all ports in the storage switch 100 connected to a device into a loop configuration 132. Note that because all of the devices are connected in a loop 132, and all ports are involved in the initialization, the transmission of data through the ports must stop during the LIP cycle.

After the at least three LIP ordered sets 110 are received by the new device 108, the LIP ordered sets 110 are then propagated to device 102, and the storage switch 100 sends a LOOP_DOWN event associated with port 112 to the processor 138. The LIP ordered sets 110 are then propagated to the next device 104, and the process continues. In general, the storage switch 100 sends a LOOP_DOWN event associated with each port in the loop to the processor 138 as the LIP ordered sets 110 are passed along to the next device in the loop.

The new device 108 then sends out a Loop Initialization Select Master (LISM) frame 140 to all devices in the loop 132, one by one, with the address (worldwide name) of the new device 108 initially stored into the LISM frame 140. As other devices in the loop receive the LISM frame 140, the address stored in the LISM frame 140 is checked. If a device has a greater worldwide name (lower number), it replaces the address in the LISM frame 140 with its own greater worldwide name. Eventually, the LISM frame 140 arrives back at the new device 108, containing the greatest worldwide name of any of the devices in the loop 132. The device with the greatest worldwide name (lowest number) is designated as the loop initialization master (LIM) of the initialization phase. The new LIM device sends ARB(f0) ordered sets around the loop to indicate that a master has been selected. From that point forward, the device designated as the LIM sends out future initialization frames.

In the example of FIG. 1b, assume that device 104 is designated as the LIM. The LIM then sends out a loop initialization fabric address (LIFA) frame 142 to all devices in the loop 132, one by one, which ensures that if any device was fabric attached and had a fabric address, it will retain that fabric address. In particular, devices with fabric addresses receive the LIFA frame 142 and can request that same fabric address by partially filling in the LIFA frame 142 with their fabric address. As the LIFA frame 142 makes its way around the loop 132, the fabric addresses being reserved are stored in the LIFA frame 142, so the same address cannot be assigned to two different devices. Note that every device on the loop 132 must have a unique one-byte Arbitrated Loop Protocol Address (ALPA), which can have 127 possible values. When the LIFA frame 142 has made it all the way around the loop 132, the LIM receives the LIFA frame 142, signifying the end of the LIFA phase. The LIM then sends out a loop initialization previous address (LIPA) frame 144 to all devices in the loop 132, one by one, which ensures that if any device had a previous address, it would retain that previous address. In particular, devices with previous addresses receive the LIPA frame 144 and can request that same previous address by partially filling in the LIPA frame 144 with their previous address. The LIM then sends out a loop initialization hardware address (LIHA) frame 146 to all devices in the loop 132, one by one, which ensures that if any device had a hardware address (e.g. hardcoded by dual in-line package (DIP) switches), it would retain that hardware address. In particular, devices with hardware addresses receive the LIHA frame 146 and can request that same hardware address by partially filling in the LIHA frame 146 with their hardware address. The LIM then sends out a loop initialization software address (LISA) frame 148 to all devices in the loop 132, one by one, which ensures that if any device had a software address, it would retain that software address. In particular, devices with software addresses receive the LISA frame 148 and can request that same software address by partially filling in the LISA frame 148 with their software address. Optionally, the LIM then sends out a loop initialization report position (LIRP) frame 150 to all devices in the loop 132, one by one, which is a frame that provides the address and a mapping of every device in the loop, and a loop initialization loop position (LILP) frame 152, which shows all devices in the loop 132. Each device on the loop adds their address to the LIRP frame in turn, and the LILP frame repeats the completed LIRP frame so that everyone gets the same information about loop position.

If the operations described above are completed without errors, indicating a successful initialization, the LIM sends a CLS ordered set 120 to all devices in the loop 132, one by one. As the CLS ordered set 120 propagates through each device and port in the loop 132, the storage switch 100 sends a LOOP_UP event associated with each port to the processor 138. When the CLS ordered set 120 has propagated all the way back to the LIM, signifying the end of the LIP cycle, the storage switch 100 re-configures those ports in the storage switch 100 connected to a device for normal operation. After all ports are once again configured for normal operation, data can flow again.

Because no data can flow during a LIP cycle, it is desirable to minimize the amount of time that the devices are in a LIP cycle in order to maximize throughput. However, problems may occur that prevent the LIP cycle from completing and sending out a CLS ordered set, either indefinitely or for a predetermined amount of time. For example, at a hardware level, one of the devices may malfunction and not pass frames around the loop, or may pass invalid frames. Furthermore, because the storage switch may be partially implemented as a state machine, errors in the state machine may occur. In addition, at a system level, there may be unresolvable contention between devices for the LIM in the LISM phase of the LIP cycle, resulting in multiple LISMs being repeatedly sent (a "LISM storm") without any resolution of who is the LIM. There may also be firmware incompatibilities between a device and a storage switch.

If the LIP cycle cannot run to completion as signified by a CLS ordered set, the new device 106 may repeatedly retransmit the LIP ordered set. This retransmission of the LIP ordered set may continue indefinitely. As long as no CLS ordered set is received, it will appear that a LIP cycle is still in progress, and the loop will not be able to resolve itself. The flow of data will remain blocked, reducing throughput to zero.

The initialization problems described above may be difficult to isolate. It is possible that communications within the loop during the execution of a LIP cycle may be completely adhering to the FC specification, and yet there still may be problems with initialization. Because the only manifestation of a problem LIP cycle is the lack of a CLS ordered set, it is also impossible to determine where the failure occurred. In conventional storage switches, one way to terminate a LIP cycle that has not run to completion with a CLS ordered set is to manually take the storage switch down and test each device individually (using a PTBI operation) until the malfunctioning device is located. Another alternative is to cycle power to the storage switch. The storage switch will then treat each device connected to it as a new device being inserted, and will run a PTBI operation on each device.

Therefore, there is a need to monitor, detect and remove malfunctioning devices from an arbitrated loop on a per-port basis without having to manually take the switch down and test each device individually until the malfunctioning device is located.

SUMMARY OF THE INVENTION

The present invention is directed to the monitoring, detection and removal of possibly malfunctioning devices from an arbitrated loop on a per-port basis, and reinsertion of those devices into the loop should they be verified as operational or become operational again. Embodiments of the present invention may be implemented in hardware or incorporated in firmware in an application programming interface (API) that may be shipped with a storage switch, provided separately on magnetic media, or downloaded, and is executed by a processor connected to the storage switch.

When a new device is first connected to a storage switch via a first port, a processor performs a PTBI event. If the PTBI event indicates that the new device is operating properly, the processor initiates a LIP cycle to the new device. Upon receiving a LIP ordered set at the first port, the storage switch sends a LOOP_DOWN event associated with the first port to the processor, and configures the other ports in the storage switch into a loop configuration. The processor also starts a loop down timer for the LOOP_DOWN event associated with the first port. The LIP ordered set is then propagated to another device in the loop. As the LIP ordered set propagates around the loop, the storage switch sends a LOOP_DOWN event to the processor for each device in the loop, and the processor also starts a loop down timer for the LOOP_DOWN event associated with each port in the loop.

A LISM frame is transmitted around the loop to determine the LIM. After the LIM has been identified, the various frames (e.g. LIFA, LIPA, LIHA, LISA, and optionally LIRP and LILP) that comprise the LIP cycle are transmitted around the loop by the LIM, and the various actions associated with those frames are performed.

If the operations described above are completed without errors, indicating a successful initialization, the LIM sends a CLS ordered set to all devices in the loop, one by one. As the CLS ordered set propagates through each device and port in the loop, the storage switch sends a LOOP_UP event associated with each port to the processor, and the loop down timer associated with each port is reset. When the CLS ordered set has propagated all the way back to the LIM, signifying the end of the LIP cycle, the storage switch re-configures those ports in the storage switch connected to a device for normal operation. After all ports are once again configured for normal operation, data can flow again.

However, if a loop down timer associated with an individual port reaches its end count (a timeout) without having received a LOOP_UP event, this is an indication that a problem occurred during the LIP cycle and that a CLS ordered set has not yet been transmitted around the loop. If a loop down timer reaches its end count, the device associated with that timer is bypassed so that the devices in the remainder of the loop can continue trying to complete the LIP cycle. A new, smaller loop is formed by the remaining ports and their associated devices, and the smaller loop continues with the LIP cycle in an attempt to complete the LIP cycle.

If the smaller loop still cannot complete the LIP cycle, this is an indication that there is still a problem with at least one of the devices connected in the loop. When another loop down timer reaches its end count, the device associated with that timer is bypassed, a new, even smaller loop is formed by the remaining ports and their associated devices, and the even smaller loop continues with the LIP cycle in an attempt to complete the LIP cycle.

This process of loop down timer timeout and bypassing of devices continues, one device at a time, until the devices remaining in the loop are able complete the LIP cycle, indicating that all malfunctioning devices have been removed from the loop. When this occurs, a CLS ordered set propagates to all of the devices remaining in the loop, a LOOP_UP event is initiated for each device, and the loop down timer for each device is reset.

Meanwhile, after a device is bypassed and a predetermined amount of time passes as defined by a recovery wait timer, the processor initiates a PTBI event on the port connected to the bypassed device. The PTBI event first instructs the storage switch to configure the port in a loop back mode. Processor then sends a LIP ordered set to the bypassed device to start an individual LIP cycle. This individual LIP cycle also results in the starting of a device monitor timer in the processor. After the device monitor timer times out, the processor evaluates the bypassed device to determine if it is behaving properly or malfunctioning. As long as the bypassed device is found to be malfunctioning, PTBI events are repeatedly performed. However, if the bypassed device is found to be operating properly, it is then re-inserted back into the loop, if the loop is still open. If the loop has closed, meaning that the LIP cycle for the devices connected to the storage switch has completed, then the device being re-inserted is treated like any other device being attached to a storage switch (i.e. a new LIP cycle for the device connected to the storage switch is initiated).

BRIEF DESCRIPTION OF THE DRAWINGS

FIG. 2*a* illustrates an exemplary storage switch with devices in a loop configuration being initialized according to embodiments of the present invention.

FIG. 2*b* illustrates an exemplary storage switch with devices in a loop configuration being initialized and one device being bypassed and tested according to embodiments of the present invention.

FIG. 2*c* illustrates an exemplary storage switch with devices in a loop configuration being initialized and another device being bypassed and tested according to embodiments of the present invention.

FIG. 2*d* illustrates an exemplary storage switch with devices in a loop configuration being initialized, one device being reinserted into the loop, and another device being bypassed from the loop according to embodiments of the present invention.

DETAILED DESCRIPTION OF PREFERRED EMBODIMENTS

Figure 1A:
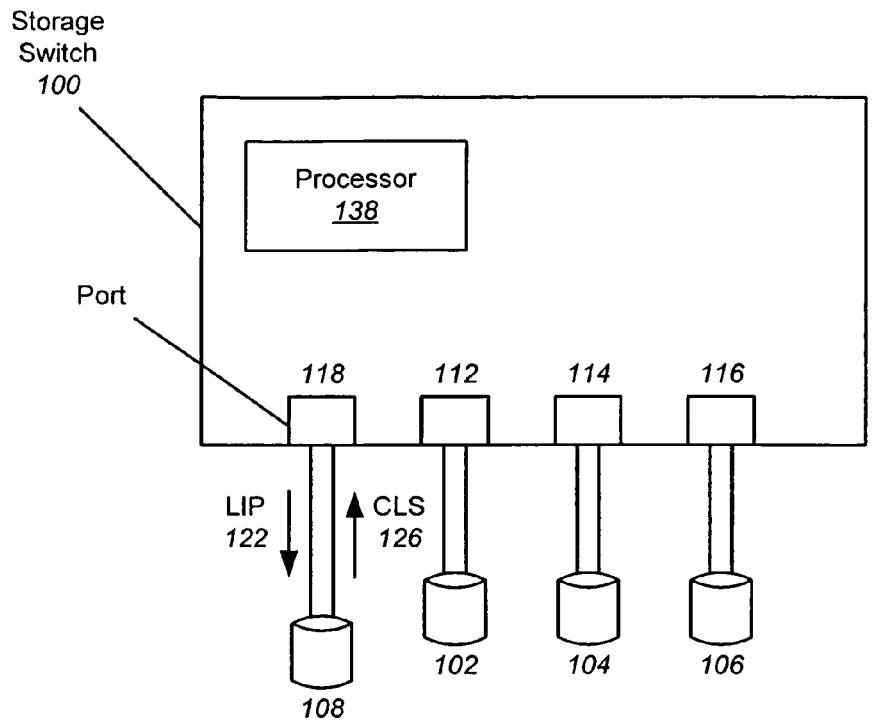
FIG. 1*a* illustrates an exemplary storage switch with a new device being tested before insertion according to conventional procedures.
Figure 1B:
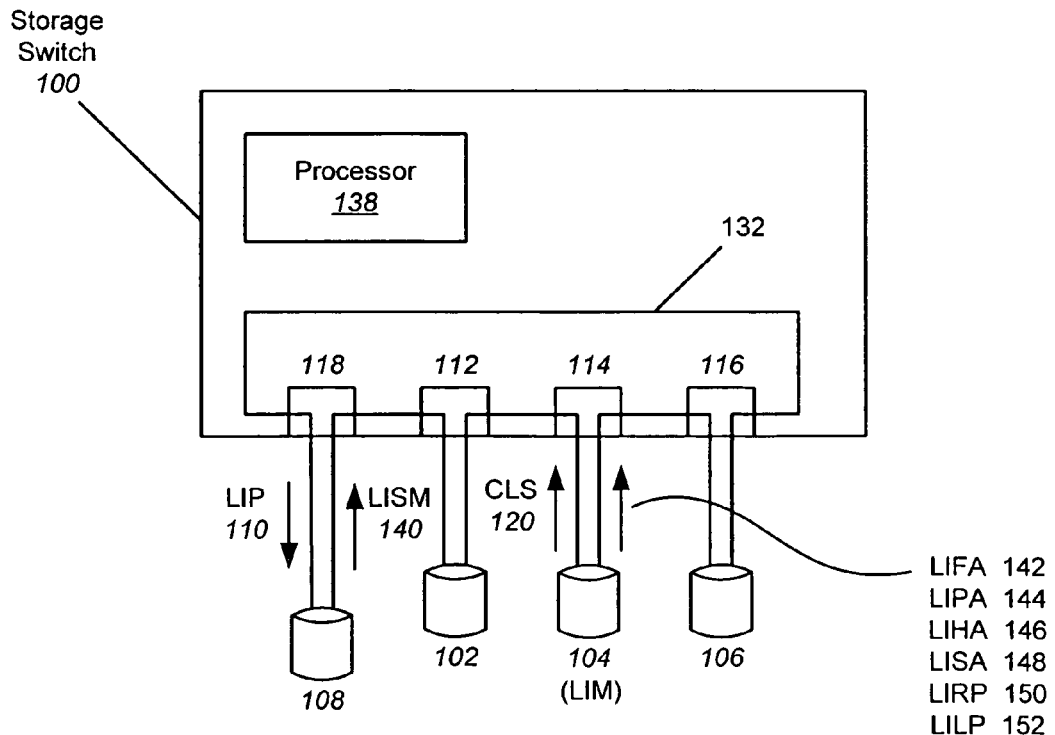
FIG. 1*b* illustrates an exemplary storage switch with devices in a loop configuration being initialized according to conventional initialization procedures.

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are directed to the monitoring, detection and removal of possibly malfunctioning devices from an arbitrated loop on a per-port basis, and reinsertion of those devices into the loop should they be verified as operational or become operational again. Embodiments of the present invention may be implemented in hardware or incorporated in firmware in an application programming interface (API) that may be shipped with a storage switch, provided separately on magnetic media, or downloaded, and is executed by a processor connected to the storage switch.

FIG. 2*a* illustrates an exemplary storage switch 200, a processor 238, ports 218, 212, 214, and 216, and an API 254 for executing a port bypass, testing and recovery procedure according to embodiments of the present invention. Storage switch 200 is initially connected to devices 202, 204 and 206 via ports 212, 214 and 216. In embodiments of the present invention, PTBI as described above must be enabled in the API 254. Therefore, when a new device 208 is first connected to the switch 200 via port 218, the processor 238 performs a PTBI event as described above.

As illustrated in FIG. 2*a*, if the PTBI event indicates that new device 208 is operating properly, processor 238 initiates another LIP cycle by sending out LIP ordered sets 210 to new device 208. Upon receiving at least three LIP ordered sets 210 at port 218, the storage switch 200 sends a LOOP_DOWN event associated with port 218 to the processor 238, and configures those ports in the storage switch 200 connected to a device into a loop configuration 232. The processor 238 also starts a loop down timer for the LOOP_DOWN event associated with port 218. The LIP ordered sets 210 are then propagated to device 202, and the storage switch 200 sends a LOOP_DOWN event associated with port 212 to the processor 238, which also starts a loop down timer for the LOOP_DOWN event associated with port 212. The LIP ordered sets 210 are then propagated to the next device 204, and the process continues. In general, storage switch 200 sends a LOOP_DOWN event to the processor 238 for each device in the loop, and the processor 238 also starts a loop down timer for the LOOP_DOWN event associated with each port in the loop.

A LISM frame is transmitted around the loop to determine the LIM, as described above. After the LIM has been identified, the various frames (e.g. LIFA, LIPA, LIHA, LISA, and optionally LIRP and LILP) that comprise the LIP cycle are transmitted around the loop 232 by the LIM, and the various actions associated with those frames are performed.

If the operations described above are completed without errors, indicating a successful initialization, the LIM sends a CLS ordered set 220 to all devices in the loop 232, one by one. As the CLS ordered set 220 propagates through each device and port in the loop, the storage switch 200 sends a LOOP_UP event associated with each port to the processor 238, and the loop down timer associated with each port is reset. When the CLS ordered set 220 has propagated all the way back to the LIM, signifying the end of the LIP cycle, the storage switch 200 re-configures those ports in the storage switch 200 connected to a device for normal operation. After all ports are once again configured for normal operation, data can flow again.

However, if a loop down timer associated with an individual port reaches its end count (a timeout) without having received a LOOP_UP event, this is an indication that a problem occurred during the LIP cycle and that a CLS ordered set has not yet been transmitted around the loop. It should be understood that a timeout does not necessarily mean that the device associated with that timer is malfunctioning. Nevertheless, if the loop down timer reaches its end count, the device associated with that timer is bypassed (taken out of the loop by reconfiguration of the port associated with that device), so that the devices in the remainder of the loop can continue trying to complete the LIP cycle. In the example of FIG. 2b, because new device 208 initiated the LIP cycle, the loop down timer associated with port 218 was started first, and that if there is a problem with initialization, that loop down timer will reach the timeout condition before any other loop down timers in the loop 232. Thus, if the loop down timer associated with port 218 has a timeout first, port 218 is reconfigured so that device 208 is bypassed. A new, smaller loop 234 is formed by ports 212, 214 and 216 and their associated devices, and the smaller loop 234 continues with the LIP cycle in an attempt to complete the LIP cycle.

After the device 208 is bypassed and a predetermined amount of time passes as defined by a recovery wait timer, processor 238 initiates a PTBI event on port 218. The PTBI event first instructs the storage switch 200 to configure port 218 in a loop back mode. Processor 238 then sends a LIP ordered set 222 to new device 1Q8 to start an individual LIP cycle. This individual LIP cycle also results in the starting of a device monitor timer in processor 238. After the device monitor timer times out, processor 238 evaluates new device 208 to determine if it is behaving properly or malfunctioning. At the physical layer, new device 208 can be identified as malfunctioning if CRC errors were generated, if there were OS errors, or if there were bad transmission words. At the FC protocol level, device 208 can be identified as malfunctioning if the new device 208 does not return a SOF, IDLE, ARB or EOF ordered set, or if the new device 208 does not return a CLS ordered set 226 (which signifies the end of the individual LIP cycle). As long as new device 208 is found to be malfunctioning, PTBI events are repeatedly performed. However, if the device 208 is found to be operating properly, it is then re-inserted back into the loop 234, if the loop is still open. If the loop 234 has closed, meaning that the LIP cycle for the devices connected to the storage switch has completed, then the device 208 being re-inserted is treated like any other device being attached to a storage switch (i.e. a new LIP cycle for the device connected to the storage switch is initiated).

Figure 3:
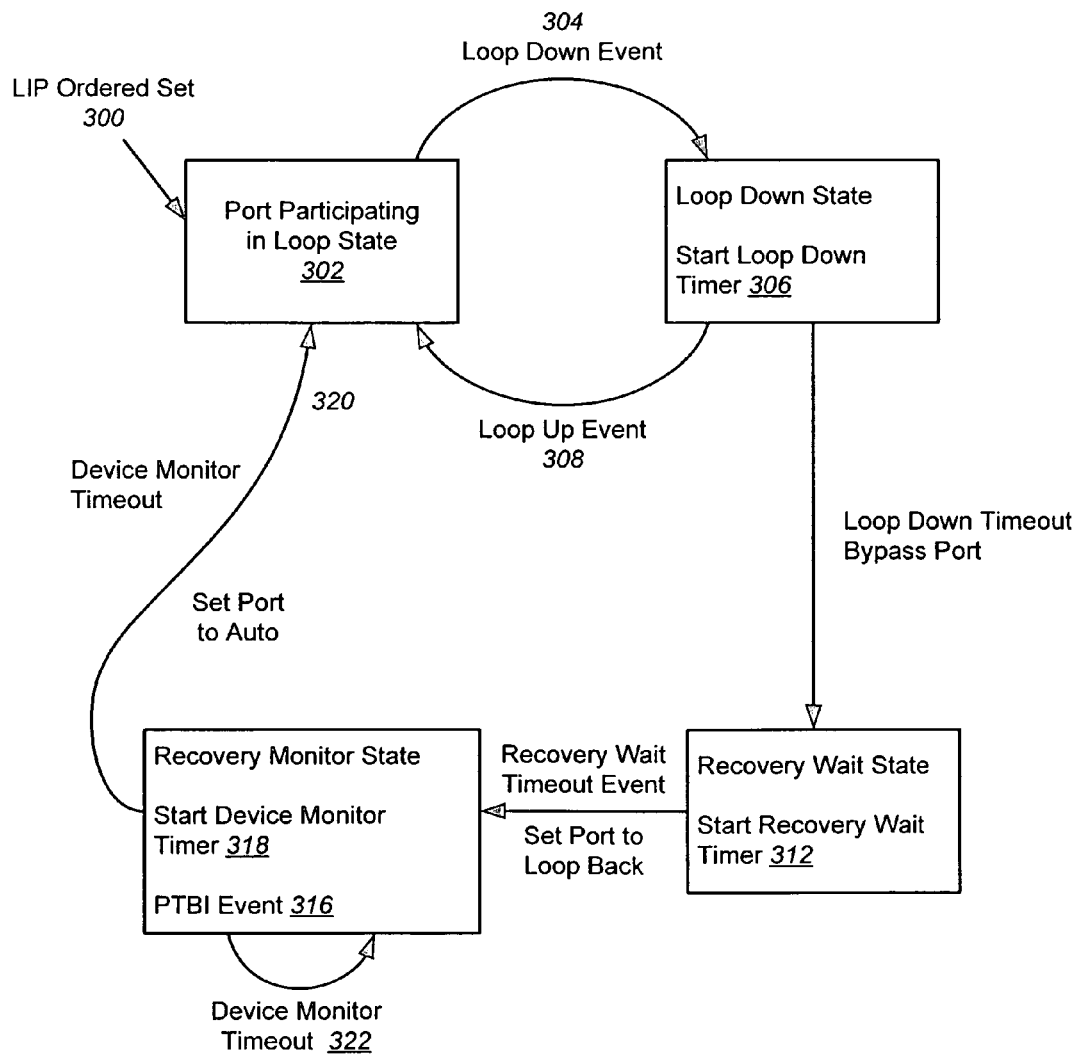
FIG. 3 is a state diagram summarizing the bypassing of a device, its testing, and its reinsertion into the loop according to embodiments of the present invention.

FIG. 3 is a state diagram summarizing the bypassing of a device, its testing, and its reinsertion into the loop as described above according to embodiments of the present invention. When LIP ordered sets 300 are propagated to a port 302 in a loop, a LOOP_DOWN event 304 and a loop down timer 306 are started. If a CLS ordered set is received by port 302 prior to the loop down timer timeout, a LOOP_UP event 308 is started, indicating that the LIP cycle has been completed successfully. However if the loop down timer 306 times out, then the device is bypassed by reconfiguring the port at 310, and a recovery wait timer 312 is started. When the recovery wait timer 312 times out, the port is configured in a loop back mode at 314, and a PTBI event 316 is started along with a device monitor timer 318. If, after the device monitor timer 318 times out, the device is functioning properly, it is added back into the loop at 320. However, if the device is malfunctioning, a new PTBI event is started at 322.

Meanwhile, referring again to FIG. 2b, if one of the other devices in the smaller loop 234 is malfunctioning, then the smaller loop 234 will still not be able to complete the LIP cycle and transmit a CLS ordered set. Because the loop down timer associated with port 212 was started second, it will be the next loop down timer to timeout. As illustrated in FIG. 2c, when this occurs, port 212 is reconfigured so that device 202 is taken out of the loop in addition to device 208, which was previously taken out of the loop. A new, even smaller loop 236 is formed by ports 214 and 216 and their associated devices, and the even smaller loop 236 continues with the LIP cycle in an attempt to complete the LIP cycle.

This process of loop down timer timeout and bypassing of devices continues, one device at a time, until the devices remaining in the loop are able complete the LIP cycle, indicating that all malfunctioning devices have been removed from the loop. When this occurs, a CLS ordered set propagates to all of the devices remaining in the loop, a LOOP_UP event is initiated for each device, and the loop down timer for each device is reset.

In the example of FIG. 2c, assume that device 202 is the malfunctioning device. After device 202 is taken out of the loop and a recovery wait timer is started and times out, a PTBI event is initiated, where the storage switch 200 sends a LIP ordered set 224 to device 202 individually, to determine if device 202 is the malfunctioning device or not. Because device 202 is malfunctioning, the individual LIP cycle will fail to complete by not returning a CLS ordered set 228 within the time specified by a device monitor timer. When device 202 fails the individual LIP cycle, it is identified as a malfunctioning device, and is not permitted to rejoin the loop. When a device fails an individual LIP cycle, PTBIs may be run on that device repeatedly, but as long as the LIP cycles continue to fail, the device will not be permitted to rejoin the loop. Failing devices can be identified as bypass events. User applications may check the bypass events to determine which devices are malfunctioning. In addition, lights can be made to blink, identifying the malfunctioning devices.

Meanwhile, as described above, new device 208 may eventually be found to be operating properly, and if the even smaller loop 236 is still open when new device 208 is found to be operating properly, new device 208 will be added back into the loop as illustrated in FIG. 2d. When new device 208 is added back into the loop it is again treated like a new device, and a PTBI event is executed, as described above. If the PTBI event indicates that new device 208 is operating properly, a LIP cycle starts over again, as described above (but minus port 202). This time, however, because malfunctioning device 202 has been taken out of the loop, the loop will eventually be able to resolve itself, complete the LIP cycle and transmit a CLS ordered set 230 around the loop before any loop down timeouts occur, causing the loop down timers to reset and the loop to close. If the even smaller loop 236 has already closed when device 208 is found to be operating properly, then when device 208 is added back in to storage switch 200 (no longer bypassed), it is again treated like a new device, and the process described above repeats.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for detecting and removing possibly malfunctioning devices attached to a storage switch during initialization of the devices when the devices are connected in a loop, comprising:

sequentially starting a loop down timer for each device as an initialization start command is propagated to each device in the loop;

sequentially resetting the loop down timer for each device in the loop if an initialization end command is propagated to the device, the initialization end command being propagated to each device in the loop if there are no malfunctioning devices in the loop; and sequentially bypassing each device whose loop down timer reaches an end count without being reset, each bypassed device representing a possibly malfunctioning device, and re-connecting the loop to include only those devices that have not been bypassed, until all malfunctioning devices have been bypassed and the initialization end command is able to propagate to each remaining device in the loop and reset the loop down timer for each remaining device in the loop.

2. The method as recited in claim 1, further comprising:
individually testing each device that has been bypassed to determine if the device is actually malfunctioning; and
re-inserting the individually tested device back into the loop if the device has passed the individual test.

3. The method as recited in claim 2, wherein individually testing each device comprising a Port Test Before Insert (PTBI) event.

4. The method as recited in claim 1, the initialization of the devices comprising a Loop Initialization Primitive (LIP) cycle.

5. The method as recited in claim 1, the initialization start command comprising a Loop Initialization Primitive (LIP) ordered set.

6. The method as recited in claim 1, the initialization end command comprising a Close (CLS) ordered set.

7. One or more storage media including a computer program which, when executed by one or more processors, causes the one or more processors to detect and remove possibly malfunctioning devices attached to a storage switch during initialization of the devices when the devices are connected in a loop by performing the steps of:

sequentially starting a loop down timer for each device as an initialization start command is propagated to each device in the loop;

sequentially resetting the loop down timer for each device in the loop if an initialization end command is propagated to the device, the initialization end command being propagated to each device in the loop if there are no malfunctioning devices in the loop; and sequentially bypassing each device whose loop down timer reaches an end count without being reset, each bypassed device representing a possibly malfunctioning device, and re-connecting the loop to include only those devices that have not been bypassed, until all malfunctioning devices have been bypassed and the initialization end command is able to propagate to each remaining device in the loop and reset the loop down timer for each remaining device in the loop.

8. The one or more storage media as recited in claim 7, wherein the computer program, when executed by one or more processors, causes the one or more processors to perform the steps of:
individually testing each device that has been bypassed to determine if the device is actually malfunctioning; and
re-inserting the individually tested device back into the loop if the device has passed the individual test.

9. The one or more storage media as recited in claim 8, wherein the computer program, when executed by one or more processors, causes the one or more processors to individually test each device by executing a Port Test Before Insert (PTBI) event.

10. The one or more storage media as recited in claim 7, wherein the computer program, when executed by one or more processors, causes the one or more processors to initialize the devices by executing a Loop Initialization Primitive (LIP) cycle.

11. The one or more storage media as recited in claim 7, wherein the computer program, when executed by one or more processors, causes the one or more processors to implement the initialization start command by transmitting a Loop Initialization Primitive (LIP) ordered set.

12. The one or more storage media as recited in claim 7, wherein the computer program, when executed by one or more processors, causes the one or more processors to implement the initialization end command by transmitting a Close (CLS) ordered set.

13. A storage switch comprising:
one or more processors programmed for detecting and removing possibly malfunctioning devices attached to the storage switch during initialization of the devices when the devices are connected in a loop by:

sequentially starting a loop down timer for each device as an initialization start command is propagated to each device in the loop;

sequentially resetting the loop down timer for each device in the loop if an initialization end command is propagated to the device, the initialization end command being propagated to each device in the loop if there are no malfunctioning devices in the loop; and sequentially bypassing each device whose loop down timer reaches an end count without being reset, each bypassed device representing a possibly malfunctioning device, and re-connecting the loop to include only those devices that have not been bypassed, until all malfunctioning devices have been bypassed and the initialization end command is able to propagate to each remaining device in the loop and reset the loop down timer for each remaining device in the loop.

14. The storage switch as recited in claim 13, wherein the one or more programmed processors further programmed for:
individually testing each device that has been bypassed to determine if the device is actually malfunctioning; and
re-inserting the individually tested device back into the loop if the device has passed the individual test.

15. The storage switch as recited in claim 14, wherein the one or more programmed processors further programmed for individually testing each device by executing a Port Test Before Insert (PTBI) event.

16. The storage switch as recited in claim 13, wherein the one or more programmed processors further programmed for initializing the devices by executing a Loop Initialization Primitive (LIP) cycle.

17. The storage switch as recited in claim 13, wherein the one or more programmed processors further programmed for implementing the initialization start command by transmitting a Loop Initialization Primitive (LIP) ordered set.

18. The storage switch as recited in claim 13, wherein the one or more programmed processors further programmed for implementing the initialization end command by transmitting a Close (CLS) ordered set.

19. A storage area network (SAN) comprising the storage switch of claim 13.

20. A storage switch for detecting and removing possibly malfunctioning devices attached to the storage switch during initialization of the devices when the devices are connected in a loop, comprising:

> means for sequentially starting a loop down timer for each device as an initialization start command is propagated to each device in the loop;
>
> means for sequentially resetting the loop down timer for each device in the loop if an initialization end command is propagated to the device, the initialization end command being propagated to each device in the loop if there are no malfunctioning devices in the loop; and
>
> means for sequentially bypassing each device whose loop down timer reaches an end count without being reset, each bypassed device representing a possibly malfunctioning device, and re-connecting the loop to include only those devices that have not been bypassed, until all malfunctioning devices have been bypassed and the initialization end command is able to propagate to each remaining device in the loop and reset the loop down timer for each remaining device in the loop.

21. The storage switch as recited in claim 20, further comprising:

> means for individually testing each device that has been bypassed to determine if the device is actually malfunctioning; and
>
> means for re-inserting the individually tested device back into the loop if the device has passed the individual test.

* * * * *